Patented May 20, 1941

2,242,384

UNITED STATES PATENT OFFICE 2,242,384

PROCESS FOR MAKING A SULPHUR PREPARATION FOR USE IN PROTECTING PLANTS AGAINST ATTACKS OF LIVING ORGANISMS

Frederik L. Begtrup, Svebolle, Denmark

No Drawing. Application November 4, 1936, Serial No. 109,118. In Denmark November 23, 1935

3 Claims. (Cl. 167—20)

It has long been known that finely divided sulphur is effective in combating certain plant diseases and some attacks of insects on cultivated plants. It is further known that the finer the sulphur particles are, the more effective is the powder. It has therefore been recognized that sulphur in colloidal form, or approximately colloidal form, produces the best results.

Inasmuch however, as colloidal sulphur prepared by the usual methods, from solutions of sulphides or thiosulphates by addition of acid and the presence of a colloid protector, or by melting sulphur in the presence of an inorganic, water-absorptive medium has proven to be too expensive in proportion to the usual crop value, this application has heretofore had no significance. The same is true of the application of ordinarily precipitated sulphur.

The present invention relates to a process for producing a sulphur preparation in which the sulphur is present in very fine, partly colloidal form, said process requiring so simple equipment and so cheap raw materials that the practical application of the preparation in fighting plant diseases becomes possible.

According to the invention, this is attained by liberating the said sulphur from an aqueous lime-sulphur solution, by spreading this over a finely divided neutral material, (preferably diatomaceous earth), which is insoluble in the solution, without addition of acid or introduction of sulphur dioxide.

The lime-sulphur solution is here absorbed by the large surface area of the finely divided material, and it is decomposed under the evolution of heat, forming free sulphur, which is liberated in finely divided form, occasionally even as colloidal sulphur.

Experiments have shown that lime-sulphur-solution is particularly well suited for the making of the preparation. Lime-sulphur-solution, as is well known, contains calciumpentasulphide, calciumtetrasulphide and some calciumthiosulphate, as well as small amounts of other sulphur compounds. It usually contains about 25 per cent sulphur and up to 70 per cent water. In the experiments made, this liquid has, for example, been sprayed on diatomaceous earth, which was stirred during the spraying. It has here been found that 50 parts lime-sulphur-solution can be worked into 100 parts diatomaceous earth without making this wet on its surface, which conditions the speed of liberating the sulphur and reduces the cost of a later drying to a minimum. During and after the mixing, considerable heat is evolved due to the decomposition of the polysulphides, and it has been found necessary, when large amounts were in process, to cool the mixture by continuous stirring, to prevent the temperature from reaching the melting point of the sulphur.

After the temperature again dropped, the mixture was dried in an oven at a temperature not exceeding 100° centigrade. The mixture was then ground.

A chemical examination of a mixture prepared in this manner shows that it is completely free from polysulphides, while it contains the major part of the sulphur of the lime-sulphur-solution as free sulphur and in addition some calcium thiosulphate as well as small amounts of other sulphur compounds.

A preparation produced by this process is particularly adapted to dusting of plants against fungi diseases, such as scab on apples and pears, mildew and a number of other fungi diseases, as well as in combating red spider.

In place of ordinary diatomaceous earth, there can be used other finely divided siliceous materials, such as kieselguhr or moler, or other less expensive finely divided materials, such as clays, notably kaolin, various other silicates, or insoluble carbonates and sulphates, such as gypsum, or pulverized sulphur.

In case of preparations of the kind considered here, the problem always prevails that the preparation, in order to serve its purpose, must be active in combating the living organisms in question and at the same time be harmless to the plant itself.

According to experiments, the preparation produced by the process of this application is distinguished by being very poisonous to the attacking organisms, particularly fungi, and under no circumstances harmful to those plants which ordinarily are treated with sulphur preparations, provided that the temperature does not rise above 35 centigrade during or immediately following the treatment.

In many instances, particularly when it is a matter of protecting plants against combined attacks of several different organisms, it will be expedient to mix the preparation with one or more other substances, such as sulphur, lead arsenate, nicotine, powdered derris or pyrethrum.

Having thus described my invention I claim:

1. The herein described process of making a dusting preparation for use in protecting plants against attack by living organisms, consisting in absorbing a lime-sulphur solution in finely divided neutral material which is insoluble in the solution, the solution being in a quantity insufficient to wet the surfaces of the particles of the material, maintaining the temperature of the mixture below the melting point of sulphur, in drying the resulting mass, and in reducing the dried product to a powder.

2. The herein described process for making a dusting preparation for use in protecting plants against attack of living organisms, consisting in liberating from a lime-sulphur solution, finely divided sulphur with a sulphur compound effective thereafter in the presence of moisture, by spreading same over finely divided diatomaceous earth and of a quantity sufficient to absorb all liquid of the solution without wetting the surface of the diatomaceous earth, controlling decomposition heat of the polysulphides by stirring the mixture, and drying and comminuting the resulting mass.

3. The herein described process for making a dusting preparation for use in protecting plants against attack of living organisms, consisting in liberating from a lime-sulphur solution, finely divided sulphur with a sulphur compound effective thereafter in the presence of moisture, by spraying substantially fifty parts of the solution over substantially one hundred parts of finely divided diatomaceous earth, controlling decomposition heat of the polysulphides by stirring the mixture, and drying and comminuting the resulting mass.

FREDERIK L. BEGTRUP.